(12) United States Patent
Qin et al.

(10) Patent No.: US 11,674,570 B1
(45) Date of Patent: Jun. 13, 2023

(54) SELF-ADAPTIVE HEAVY-DUTY GEAR TRANSMISSION WALKING DEVICE

(71) Applicants: XUZHOU XCMG DRIVELINE TECHNOLOGY CO., LTD., Xuzhou (CN); XUZHOU UNIVERSITY OF TECHNOLOGY, Xuzhou (CN)

(72) Inventors: Datong Qin, Xuzhou (CN); Nong Zhang, Xuzhou (CN); Liqiao Jiang, Xuzhou (CN); Ming Ma, Xuzhou (CN); Chang Lyu, Xuzhou (CN); Zhongbin Wang, Xuzhou (CN); Jianjun Hu, Xuzhou (CN); Chuanhui Huang, Xuzhou (CN); Dandan Sun, Xuzhou (CN); Jun Song, Xuzhou (CN); Haodong Yin, Xuzhou (CN); Lige Xue, Xuzhou (CN); Minghu He, Xuzhou (CN); Hongrui Zhu, Xuzhou (CN); Minghui Hu, Xuzhou (CN); Yonggang Liu, Xuzhou (CN); Changzhao Liu, Xuzhou (CN); Xinhua Liu, Xuzhou (CN); Kun Han, Xuzhou (CN); Shengcheng Wang, Xuzhou (CN)

(73) Assignees: XUZHOU XCMG DRIVELINE TECHNOLOGY CO., LTD., Xuzhou (CN); XUZHOU UNIVERSITY OF TECHNOLOGY, Xuzhou (CN)

( * ) Notice: Subject to any disclaimer, the term of this patent is extended or adjusted under 35 U.S.C. 154(b) by 0 days.

(21) Appl. No.: 17/963,213

(22) Filed: Oct. 11, 2022

(30) Foreign Application Priority Data

Mar. 9, 2022 (CN) .......................... 202210221113.9

(51) Int. Cl.
*F16H 19/02* (2006.01)
*H01F 7/02* (2006.01)
*B65G 54/02* (2006.01)

(52) U.S. Cl.
CPC ............. *F16H 19/02* (2013.01); *B65G 54/02* (2013.01); *H01F 7/02* (2013.01)

(58) Field of Classification Search
CPC ............ F16H 19/02; B65G 54/02; H01F 7/02
(Continued)

(56) References Cited

U.S. PATENT DOCUMENTS

| 3,788,447 A | * | 1/1974 | Stephanoff | ............. | B65G 23/23 198/852 |
| 11,404,933 B1 | * | 8/2022 | Bonny | ..................... | H02K 5/24 |

(Continued)

FOREIGN PATENT DOCUMENTS

| CN | 202575726 U | 12/2012 |
| CN | 107685784 A | 2/2018 |

(Continued)

*Primary Examiner* — James R Bidwell
(74) *Attorney, Agent, or Firm* — Bayramoglu Law Offices LLC

(57) ABSTRACT

A self-adaptive heavy-duty gear transmission walking device includes a guide track. A carrying seat is slidably installed on the guide track. A loading platform is arranged on the carrying seat, and matching frames are arranged at the bottom of the carrying seat and positioned opposite from each other. A first driving mechanism, a walking mechanism, a first support bracket, a stop mechanism, and a second support bracket are arranged on the carrying seat. A vertical support mechanism and a horizontal support mechanism are arranged in the matching frame. The first driving mechanism is connected to one end of the walking mechanism. The walking mechanism penetrates through the carrying seat and is magnetically connected to the guide track. The other end of the walking mechanism is connected to a first transmission shaft. The first transmission shaft penetrates through the first support bracket and is fixedly installed with a brake disc.

10 Claims, 6 Drawing Sheets

(58) Field of Classification Search
USPC .......................................................... 198/805
See application file for complete search history.

(56) References Cited

U.S. PATENT DOCUMENTS

| | | | | |
|---|---|---|---|---|
| 2015/0175143 | A1* | 6/2015 | Sun | F16D 65/183 |
| | | | | 74/89.16 |
| 2019/0337727 | A1* | 11/2019 | Wireman | B61B 13/02 |
| 2020/0354166 | A1* | 11/2020 | Abe | B65H 5/14 |
| 2022/0348115 | A1* | 11/2022 | Lee | H02K 7/116 |

FOREIGN PATENT DOCUMENTS

| | | | | |
|---|---|---|---|---|
| CN | 111235983 | A | 6/2020 | |
| CN | 213003441 | U | 4/2021 | |
| GB | 477953 | A | 1/1938 | |
| JP | H10109671 | A | 4/1998 | |
| WO | 2007021206 | A1 | 2/2007 | |
| WO | 2007032693 | A1 | 3/2007 | |
| WO | 2017/149377 | | * 9/2017 | ............. B65G 54/02 |
| WO | 2020/011624 | | * 1/2020 | ............. B65G 54/02 |
| WO | 2021235535 | A2 | 11/2021 | |

* cited by examiner

SELF-ADAPTIVE HEAVY-DUTY GEAR TRANSMISSION WALKING DEVICE

This application is based upon and claims priority to Chinese Patent Application No. 202210221113.9, filed on Mar. 9, 2022, the entire contents of which are incorporated herein by reference.

TECHNICAL FIELD

The present invention relates to the technical field of heavy-duty moving devices and more particularly to a self-adaptive heavy-duty gear transmission walking device.

BACKGROUND

A heavy-duty trolley and a driving device that walk on a track are suitable for carrying heavy-duty goods and are often used for transportation in a narrow space. At present, there is no developed solution in the art to ensure the transportation's accuracy and high load.

In the prior art, for example, Chinese patent CN202575726U discloses a self-adaptive heavy-duty walking mechanism driven by gears and racks, including a walking trolley, a suspension system, a composite track, and a lateral limit seat. The composite track is composed of a rack track and a steel plate track. The walking trolley is provided with a motor having a large gear transmission mechanism. The suspension system is arranged at both ends of the walking trolley. The piston end of a suspension cylinder is hinged with the walking trolley, and the cylinder end of the suspension cylinder is hinged with a cylinder seat. The walking trolley and the lateral limiting seat are movably connected through a slider shaft-slider mechanism. The lateral limiting seat and the cylinder seat are connected to a driven mechanism. The big transmission gear of the walking trolley is engaged with the rack track to form the gear-rack drive system of the walking trolley. The suspension cylinder, the wheelset of the walking trolley, and the steel plate track constitute the walking wheel system of the walking trolley. Driven by the gear and rack, the wheels of the walking trolley are tightly attached to the steel plate track to walk self-adaptively and smoothly and can be fine-tuned adaptively according to the deformation of the driven mechanism. However, the walking mechanism of this patent easily causes rollover and tipping, which may lead to material spillage at the position where the track connection is not smooth.

SUMMARY

In view of the prior art's defects, the first driving mechanism of the present invention uses the herringbone gear transmission, which has a high carrying capacity and stability during operation. The walking mechanism of the present invention has high stability, is not prone to skidding, and has a high load capacity to pull large inertia in the environment where the walking mechanism is being used. The second driving mechanism of the present invention is linked with the stop mechanism to assist the walking mechanism to stop, thereby effectively controlling the positioning accuracy of the stop. The vertical support mechanism and the horizontal support mechanism of the present invention are supported by elastically supported pulleys to enhance the load capacity and shock-proof capability and prevent rollover and jolting.

The technical solution adopted by the present invention to solve the technical problems is as follows: A self-adaptive heavy-duty gear transmission walking device includes a guide track, and a carrying seat is slidably installed on the guide track. A loading platform is arranged on the carrying seat, and matching frames are arranged at the bottom of the carrying seat and positioned opposite from each other. A first driving mechanism, a walking mechanism, a first support bracket, a stop mechanism, and a second support bracket are arranged on the carrying seat. A vertical support mechanism and a horizontal support mechanism are arranged in the matching frame. The first driving mechanism is connected to one end of the walking mechanism, and the first driving mechanism is configured to drive the walking mechanism to move. The walking mechanism penetrates through the carrying seat and is magnetically connected to the guide track. The other end of the walking mechanism is connected to a first transmission shaft. The first transmission shaft penetrates through the first support bracket and is fixedly installed with a brake disc. The stop mechanism is configured to stop the brake disc from rotating. A second driving mechanism is arranged on the second support bracket, and the second driving mechanism is configured to drive the stop mechanism to move. The walking mechanism includes two sets of third support brackets installed on the carrying seat and positioned opposite from each other. A triangle plate is rotatably installed on each of the third support brackets. Three sets of first guide shafts are installed on the triangle plate. A first slider is slidably installed on each of the first guide shafts, and a first spring is sleeved on each of the first guide shafts. One end of the first spring is fixedly connected to the first slider, and the other end of the first spring is fixedly connected to the triangle plate. Two sets of first sliders positioned opposite from each other are connected by a second transmission shaft, and magnet assemblies are rotatably installed on the second transmission shaft and positioned opposite from each other. The magnet assemblies penetrate through the carrying seat and are magnetically connected to the guide track. The walking mechanism further includes an angle annular frame arranged on the carrying seat, and the second transmission shaft is slidably connected to the inner annular surface of the angle annular frame.

Further, the first driving mechanism includes a first motor arranged on the carrying seat. The output shaft of the first motor is provided with a first gear, and a second gear is rotatably installed on the third support bracket on a side of the walking mechanism. The first gear and the second gear are herringbone gears. The second gear and the first gear are engaged with each other.

Further, the stop mechanism includes a bottom base arranged on the carrying seat. A plurality of sets of second guide shafts is arranged on the bottom base. Second springs are sleeved on both sides of the plurality of sets of second guide shafts, and brake pads for stopping the brake disc are relatively slidably installed on the second guide shafts. One end of the second spring is fixedly connected to the brake pad, and the other end of the second spring is fixedly connected to the bottom base.

Further, the second driving mechanism includes a second motor arranged on the second support bracket. The output shaft of the second motor penetrates through the second support bracket and is fixedly installed with a driving disc. Connecting rods are relatively rotatably installed on the driving disc, and the other ends of the connecting rods are rotatably connected to the brake pads.

Further, the vertical support mechanism includes a fixed block arranged in the matching frame. The third springs are arranged at both ends of the fixed block, and the other ends of the third springs are fixedly installed with the first support bases. The first sliding rods are arranged on both sides of each of the first support bases, and sliding holes corresponding to the positions of the first sliding rods are arranged in the matching frame. The first sliding rods are slidably connected to the matching frame. The first pulleys are rotatably installed on the first support bases.

Further, the horizontal support mechanism includes a fourth spring arranged in the matching frame, and the other end of the fourth spring is fixedly installed with a second support base. The second sliding rods are arranged on both sides of the second support base, and sliding holes corresponding to the positions of the second sliding rods are arranged in the matching frame. The second sliding rods are slidably connected to the matching frame. A second pulley is rotatably installed on the second support base.

Further, the first transmission shaft is provided with a limit piece corresponding to the position of the angle annular frame.

Further, the central shaft of the triangle plate adjacent to the first driving mechanism penetrates through the third support bracket and is fixedly connected to the central shaft of the second gear. The central shaft of the triangle plate adjacent to the first support bracket penetrates through the third support bracket and is fixedly connected to one end of the first transmission shaft.

Further, the guide track is made from magnetic metal.

Further, the first pulleys penetrate through the matching frame and are slidably connected to the guide track. The second pulley penetrates through the matching frame and is slidably connected to the guide track.

Compared with the prior art, the advantages of the invention are that. (1) The first driving mechanism of the present invention uses the herringbone gear transmission, which has a high carrying capacity and stability during operation. (2) The walking mechanism of the present invention has high stability, is not prone to skidding, and has a high load capacity to pull large inertia in the environment where the walking mechanism is being used. (3) The second driving mechanism of the present invention is linked with the stop mechanism to assist the walking mechanism to stop, thereby effectively controlling the positioning accuracy of the stop. (4) The vertical support mechanism and the horizontal support mechanism of the present invention are supported by elastically supported pulleys to enhance the load capacity and shock-proof capability and prevent rollover and jolting.

Figure 1:
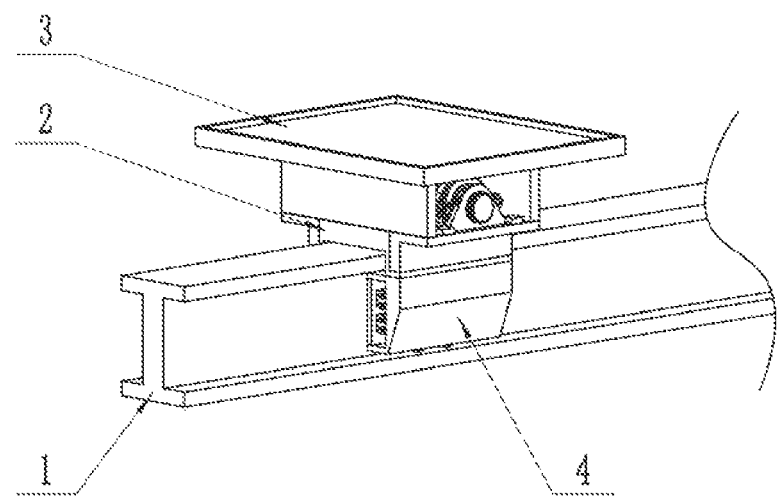
FIG. 1 is a schematic diagram of the overall structure of the present invention.

In the figures: 1. guide track; 2. carrying seat; 3. loading platform; 4. matching frame; 5. first driving mechanism; 6. walking mechanism; 7. first transmission shaft; 8. first support bracket; 9. brake disc; 10. stop mechanism; 11. second support bracket; 12. second driving mechanism; 13. vertical support mechanism; 14. horizontal support mechanism; 501. first motor; 502. first gear; 503. second gear; 601. third support bracket 3; 602. triangle plate; 603. first guide shaft; 604. first slider; 605. first spring; 606. second transmission shaft; 607. magnet assembly; 608. angle annular frame; 609. limit piece; 1001. bottom base; 1002. second guide shaft; 1003. brake pad; 1004. second spring; 1201. second motor; 1202. driving disc; 1203. connecting rod; 1301. fixed block; 1302. third spring; 1303. first support base, 1304. first sliding rod; 1305. first pulley; 1401. fourth spring; 1402. second support base; 1403. second sliding rod; 1404. second pulley.

DETAILED DESCRIPTION OF THE EMBODIMENTS

In the following description of the present invention, it should be noted that the terms describing the orientation or position relationships, such as "up," "down," "front," "back," "left," "right," "top," "bottom," "inside," and "outside," are based on the orientation or position relationships shown in the drawings. The drawings only facilitate the description of the present invention and simplify the description without indicating or implying that the device or element referred to must have a specific orientation or be constructed and operated in a particular direction; thus, they cannot be understood as a limitation to the present invention.

In the following description of the present invention, it should be noted that unless otherwise clearly defined and limited, the terms "installation," "setting," and "connection" should be understood in a broad sense. For example, a "connection" may be a fixed connection, a detachable connection, or an integrated connection; it may be a direct connection, an indirect connection through an intermediary, or communication between two components. For those having ordinary skills in the art, the specific meaning of the above terms in the present invention may be understood in specific circumstances.

The present invention is further described below in conjunction with the drawings and exemplary embodiments, where schematic embodiments and illustrations are used to explain the present invention but not as a limitation to the present invention. In addition, if the detailed description above of the prior art is not necessary to show the characteristics of the present invention, it should be omitted.

Embodiment: As shown in FIGS. 1-4, a self-adaptive heavy-duty gear transmission walking device includes a guide track 1. A carrying seat 2 is slidably installed on the guide track 1. A loading platform 3 is fixedly installed on the carrying seat 2. The loading platform 3 is configured to carry a heavy object, and matching frames 4 are fixedly installed at the bottom of the carrying seat 2 and positioned opposite from each other. A first driving mechanism 5, a walking mechanism 6, a first support bracket 8, a stop mechanism 10, and a second support bracket 11 are arranged on the carrying seat 2. A vertical support mechanism 13 and a plurality of sets of horizontal support mechanisms 14 are arranged in the matching frame 4, and the plurality of sets of horizontal support mechanism 14 are evenly distributed in a matrix array in the matching frame 4. The vertical support mechanism 13 is configured to enhance the load capacity of the present invention, and the horizontal support mechanisms 14 are configured to enhance the horizontal shock-proof capability of the present invention. The first driving mechanism 5 is connected to one end of the walking mechanism 6, and the first driving mechanism 5 is configured to drive the walking mechanism 6 to move. The walking mechanism 6 penetrates through the carrying seat 2 and is magnetically connected to the guide track 1. The other end of the walking mechanism 6 is provided with a first transmission shaft 7. The first transmission shaft 7 penetrates through the first support bracket 8 and is fixedly installed with a brake disc 9. The stop mechanism 10 is configured to stop the brake disc 9 from rotating. A second driving mechanism 12 is arranged on the second support bracket 11, and the second driving mechanism 12 is configured to drive the stop mechanism 10 to move.

Figure 2:
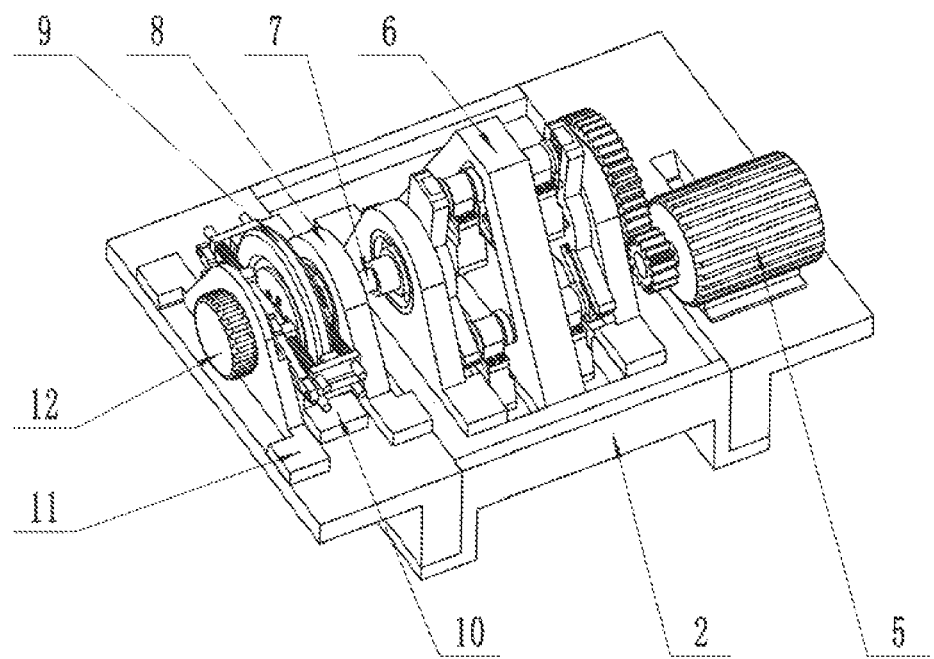
FIG. 2 is a first schematic diagram of the local structure of the present invention.
Figure 3:
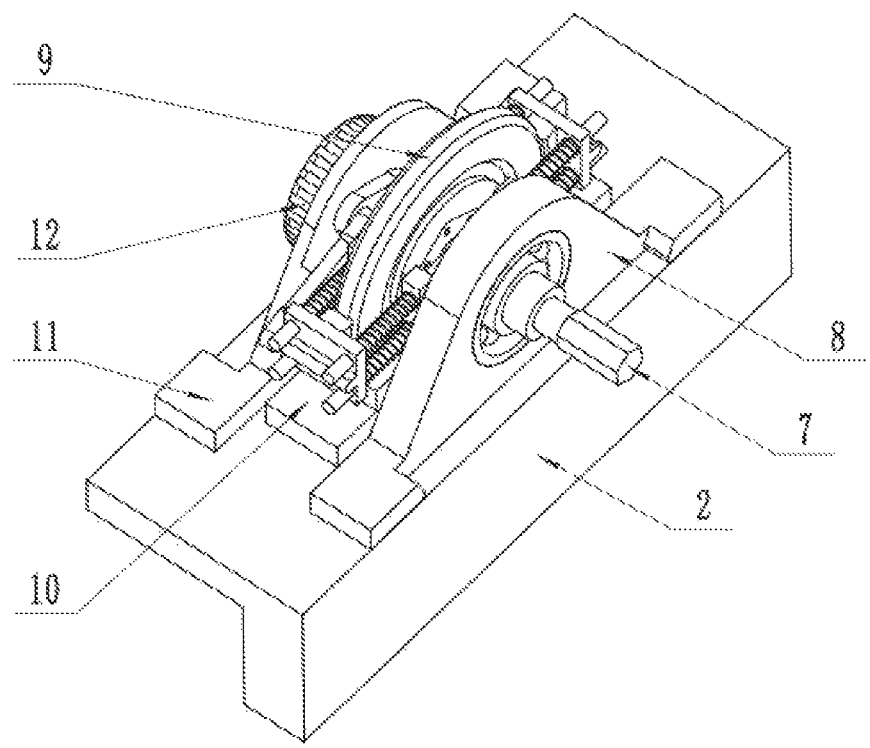
FIG. 3 is a second schematic diagram of the local structure of the present invention.
Figure 5:
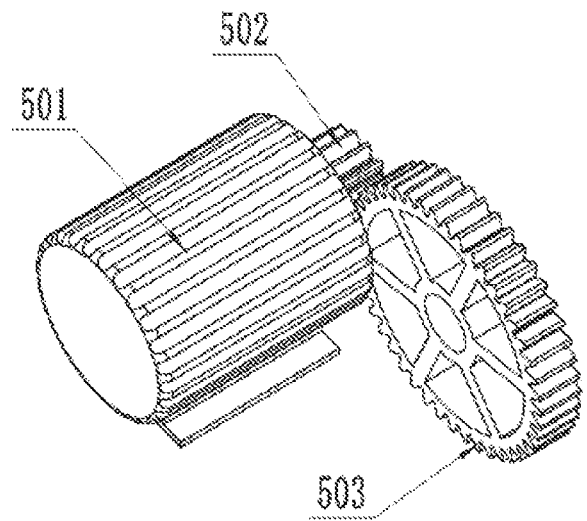
FIG. 5 is a schematic diagram of the structure of a first driving mechanism of the present invention.
Figure 6:
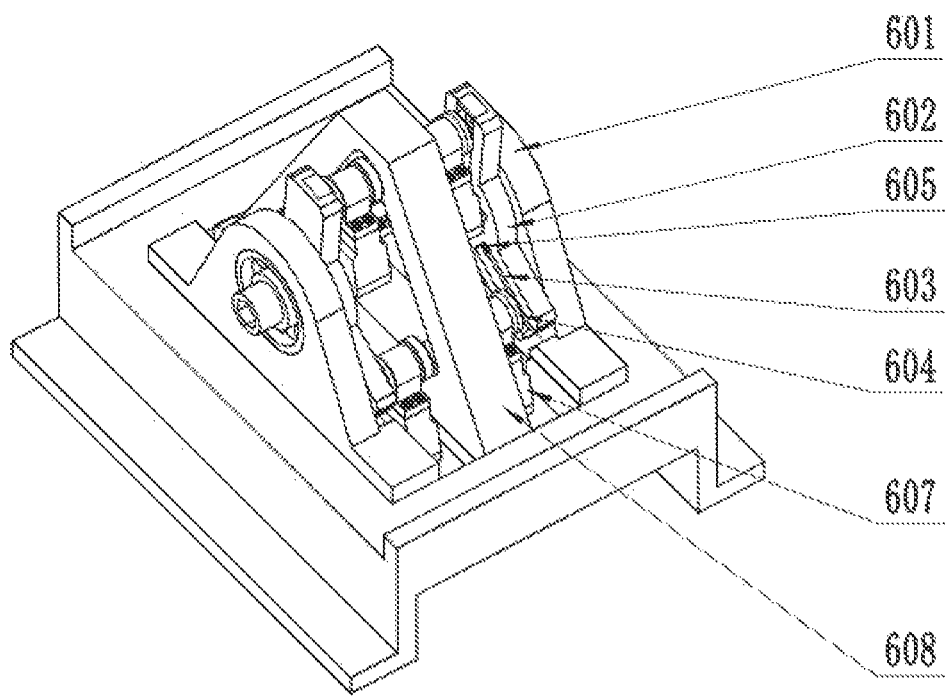
FIG. 6 is a schematic diagram of the structure of a walking mechanism of the present invention.
Figure 7:
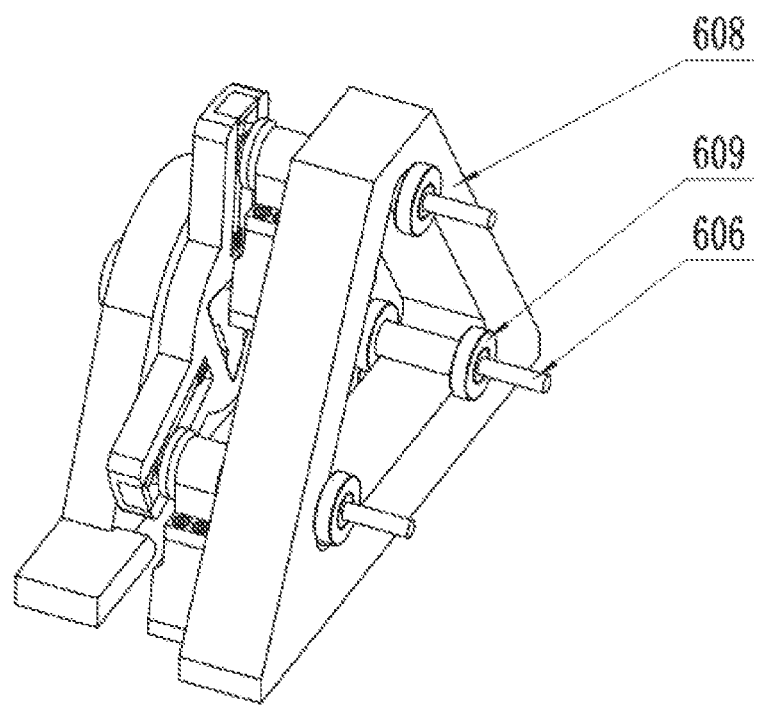
FIG. 7 is a first schematic diagram of the local structure of the walking mechanism of the present invention.
Figure 8:
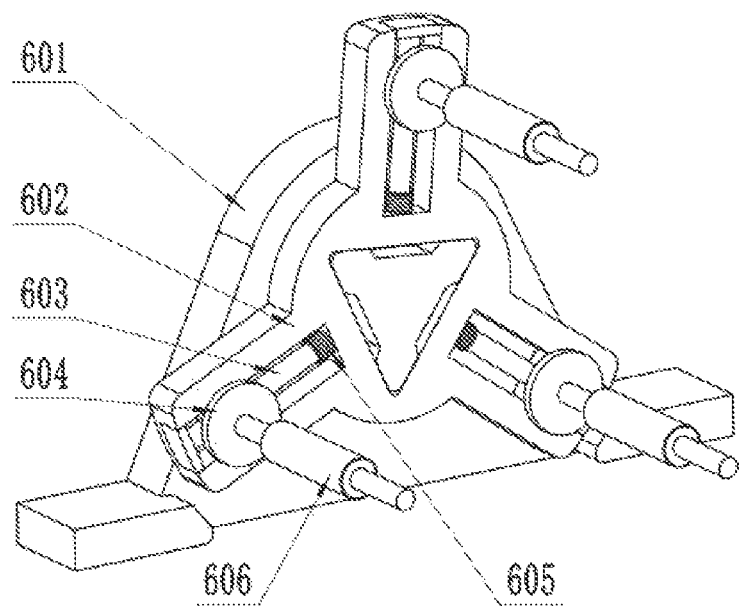
FIG. 8 is a second schematic diagram of the local structure of the walking mechanism of the present invention.

As shown in FIG. 2 and FIG. 5, the first driving mechanism 5 includes a first motor 501 fixedly installed on the carrying seat 2. The output shaft of the first motor 501 is fixedly installed with a first gear 502. One end of the walking mechanism 6 adjacent to the first driving mechanism 5 is provided with a second gear 503. Both the first gear 502 and the second gear 503 are herringbone gears. Compared with ordinary spur gears, the herringbone gear only produces a very small axial force in gear transmission, and the herringbone gear has a high load capacity and works smoothly. The second gear 503 and the first gear 502 are engaged with each other.

The first motor 501 is started to drive the first gear 502 to rotate, the first gear 502 drives the second gear 503 to rotate, and the central shaft of the second gear 503 drives the walking mechanism 6 to move.

As shown in FIG. 2 and FIGS. 6-8, the walking mechanism 6 includes two sets of third support brackets 601 fixedly installed on the carrying seat 2 and positioned opposite from each other. A triangle plate 602 is rotatably installed on each of the third support brackets 601. The central shaft of the triangle plate 602 adjacent to the first driving mechanism 5 penetrates through the third support bracket 601 and is fixedly connected to the central shaft of the second gear 503. The central shaft of the triangle plate 602 adjacent to the first support bracket 8 penetrates through the third support bracket 601 and is fixedly connected to one end of the first transmission shaft 7. Three sets of first guide shafts 603 are fixedly installed on the triangle plate 602. A first slider 604 is slidably installed on each of the first guide shafts 603, and a first spring 605 is sleeved on each of the first guide shafts 603. One end of the first spring 605 is fixedly connected to the first slider 604, and the other end of the first spring 605 is fixedly connected to the triangle plate 602. Two sets of first sliders 604 positioned opposite from each other are connected by a second transmission shaft 606, and magnet assemblies 607 are arranged on the second transmission shaft 606 and positioned opposite from each other. A magnet and a counterweight block are fixedly connected to form the magnet assembly 607, and the counterweight block is rotatably connected to the second transmission shaft 606. The magnet assemblies 607 penetrate through the carrying seat 2 and are magnetically connected to the guide track 1. The guide track 1 is made from magnetic metal. The walking mechanism 6 further includes an angle annular frame 608 fixedly installed on the carrying seat 2, and the angle annular frame 608 is shaped as an equilateral triangle. The second transmission shaft 606 is slidably connected to the inner annular surface of the angle annular frame 608. The first transmission shaft 7 is fixedly installed with a limit piece 609 corresponding to the position of the angle annular frame 608 to avoid the dislocation of the first transmission shaft 7.

When the second gear 503 rotates, the second gear 503 drives the adjacent triangle plate 602 to rotate, such that the triangle plate 602 rotates to drive the first sliders 604 to rotate through the first guide shafts 603. The first sliders 604 drive the opposite first sliders 604 to rotate through the second transmission shafts 606. The other side first sliders 604 drive the triangle plate 602 to rotate through the first guide shafts 603, and the triangle plate 602 drives the first transmission shaft 7 to rotate. The first transmission shaft 7 drives the brake disc 9 to rotate. During the rotation of the second transmission shafts 606, due to the setting of the angle annular frame 608 under the action of the tension of the first spring 605, the second transmission shafts 606 slide along the interior of the angle annular frame 608 and move in the trajectory of an equilateral triangle. In this process, the second transmission shafts 606 drive the magnet assemblies 607 to move. Since the magnet assemblies 607 are rotatably connected to the second transmission shafts 606 under the force of the counterweight block inside the magnet assemblies 607, the magnet assemblies 607 are always perpendicular to the horizontal surface of the guide track 1 due to the gravity of the magnet assemblies 607. During the movement of a set of magnet assemblies 607, when the lower end of the set of magnet assemblies 607 contacts the horizontal surface of the guide track 1, the magnet assemblies 607 exert an adsorption force on the guide track 1. At this time, the first sliders 604 drive the second transmission shafts 606 to continue to move, and when a lower end of the next set of magnet assemblies 607 contacts the horizontal surface of the track guide 1 during the movement, the magnet assemblies 607 again exert a new adsorption force on the guide track 1. The magnet assemblies 607 previously attached to the guide track 1 are separated from the guide track 1 due to the setting of the movement trajectory. The above process is repeated to realize the operation of the walking mechanism 6, and the operation mode has high stability.

Figure 9:
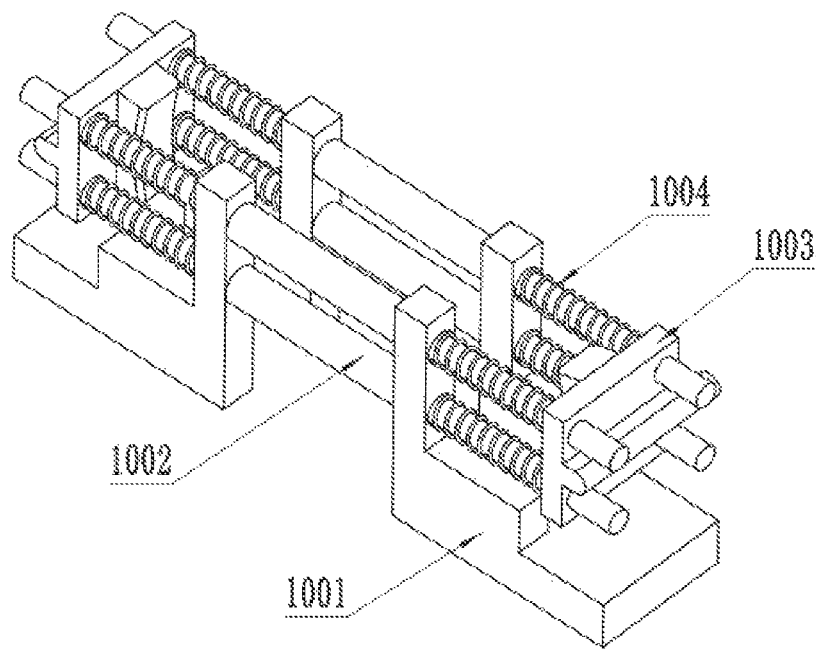
FIG. 9 is a schematic diagram of the structure of a stop mechanism of the present invention.
Figure 10:
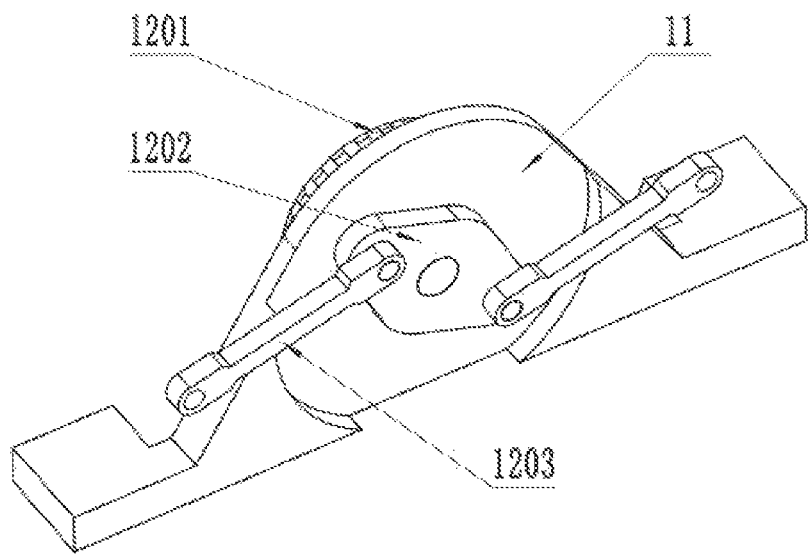
FIG. 10 is a schematic diagram of the structure of a second driving mechanism of the present invention.

As shown in FIG. 2, FIG. 9, and FIG. 10, the stop mechanism 10 includes a bottom base 1001 fixedly installed on the carrying seat 2. A plurality of sets of second guide shafts 1002 is fixedly installed on the bottom base 1001. Second springs 1004 are sleeved on both sides of the plurality of sets of second guide shafts 1002, and brake pads 1003 for stopping the brake disc 9 are relatively slidably installed on both sides of the plurality of sets of second guide shafts. One end of the second spring 1004 is fixedly connected to the brake pad 1003, and the other end of the second spring 1004 is fixedly connected to the bottom base 1001. When the second driving mechanism 12 is not started, the brake disc 9 is maintained at a certain distance from the brake pads 1003 under the force of the second springs 1004 to avoid influencing each other's movement. The second driving mechanism 12 includes a second motor 1201 fixedly installed on the second support bracket 11. The output shaft of the second motor 1201 penetrates through the second support bracket 11 and is fixedly installed with a driving disc 1202. Connecting rods 1203 are relatively rotatably installed on the driving disc 1202, and the other ends of the connecting rods 1203 are rotatably connected to the brake pads 1003.

After the heavy object is transferred to the destination, the present invention needs to be stopped. After the first driving mechanism 5 is stopped, the second driving mechanism 12 can be started to assist the first driving mechanism 5. The second motor 1201 is started to drive the driving disc 1202 to rotate, and the driving disc 1202 drives the connecting rods 1203 to swing. During the swing, the connecting rods 1203 drive the brake pads 1003 to slide on the second guide shafts 1002, such that the brake pads 1003 are in full contact with the brake disc 9, thereby stopping the brake disc 9 through the friction between the brake pads 1003 and the brake disc 9.

Figure 4:
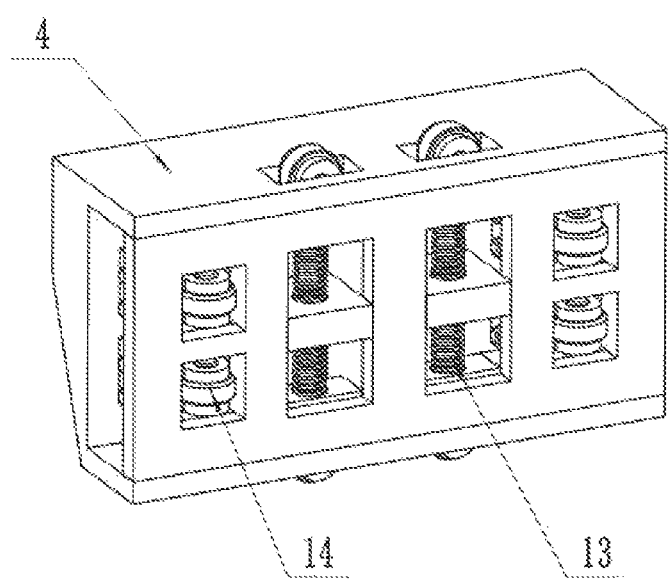
FIG. 4 is a third schematic diagram of the local structure of the present invention.
Figure 11:
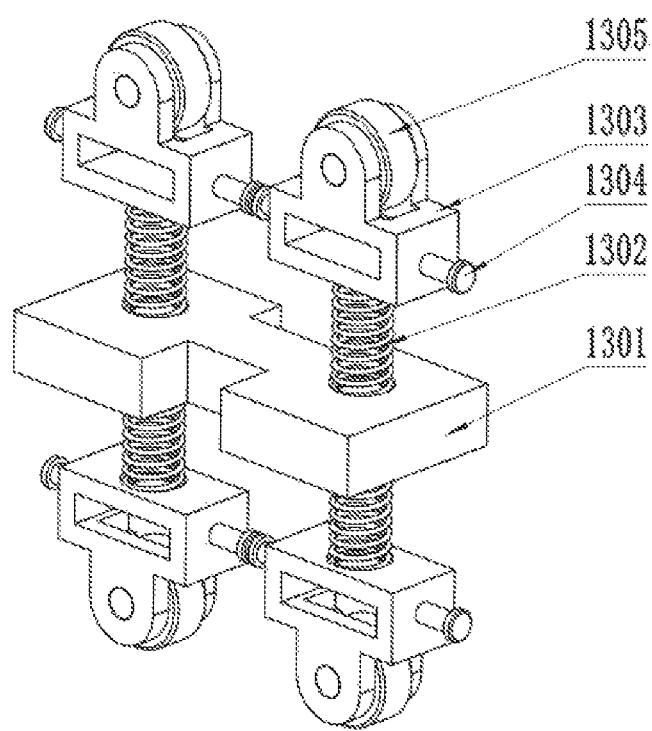
FIG. 11 is a schematic diagram of the structure of a vertical support mechanism of the present invention.

As shown in FIG. 4 and FIG. 11, the vertical support mechanism 13 includes a fixed block 1301 fixedly installed in the matching frame 4. At least two sets of third springs 1302 are fixedly installed at both ends of the fixed block 1301, and the other ends of the third springs 1302 are fixedly installed with first support bases 1303. First sliding rods 1304 are arranged on both sides of each of the first support bases 1303, and sliding holes corresponding to the positions of the first sliding rods 1304 are arranged in the matching frame 4. The first sliding rods 1304 are slidably connected to the matching frame 4. First pulleys 1305 are rotatably installed on the first support bases 1303, and the first pulleys 1305 penetrate through the matching frame 4 and are slidably connected to the guide track 1.

When the loading platform 3 operates, gravity is transferred to the matching frames 4 through the carrying seat 2. At this time, the matching frames 4 move down to a certain extent to drive the fixed block 1301 to move down during this process. The third springs 1302 on the lower side are compressed. At this time, the first pulleys 1305 are driven by the first support bases 1303 to still rotate normally, and the vertical support mechanism 13 prevents the traditional transmission shaft from deforming by gravity, which makes the transmission more stable.

Figure 12:
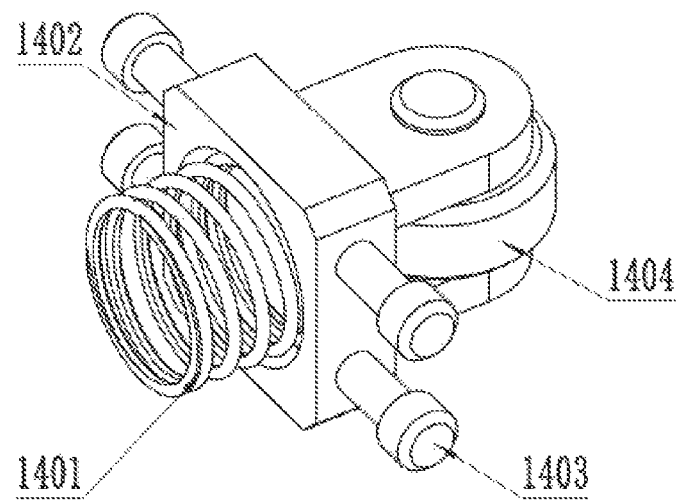
FIG. 12 is a schematic diagram of the structure of a horizontal support mechanism of the present invention.

As shown in FIG. 4 and FIG. 12, the horizontal support mechanism 14 includes a fourth spring 1401 arranged in the matching frame 4, and the other end of the fourth spring 1401 is fixedly installed with a second support base 1402. Second sliding rods 1403 are arranged on both sides of the second support base 1402, and sliding holes corresponding to the positions of the second sliding rods 1403 are arranged in the matching frame 4. The second sliding rods 1403 are slidably connected to the matching frame 4. A second pulley 1404 is rotatably installed on the second support base 1402. The second pulley 1404 penetrates through the matching frame 4 and is slidably connected to the guide track 1.

If horizontal vibration occurs in the loading platform 3 due to goods rolling or other factors when the loading platform 3 carries a heavy object, the horizontal force is transferred to the matching frames 4 through the carrying seat 2. At this time, the matching frames 4 generate left-right offsets, and the fourth springs 1401 are compressed during the movement. At this time, the second pulleys 1404 are driven by the second support bases 1402 to rotate normally. The horizontal support mechanisms 14 reduce the influence of the horizontal vibration generated during the transmission, reduce the rollover incidence, and improve transmission stability.

The working principle of the present invention is as follows: A heavy object is placed on the loading platform 3, and the first driving mechanism 5 is started. The first driving mechanism 5 drives the walking mechanism 6 to move. Through an alternating magnetic connection of the walking mechanism 6 and the guide track 1, the walking mechanism 6 drives the carrying seat 2 and other parts arranged on the carrying seat 2 to slide along the guide track 1. In the sliding process, the load capacity of the present invention is enhanced due to the setting of the vertical support mechanism 13, and the guide track 1 and the carrying seat 2 being stuck as a result of excessive weight is avoided. The setting of the horizontal support mechanisms 14 enhances the horizontal shock-proof capability of the present invention, thereby preventing problems like rollover during transportation. The first driving mechanism 5 is switched off when the heavy object is transferred to the destination, and the first driving mechanism 5 drives the walking mechanism 6 to stop operation. However, the force of inertia of the heavy object or other uncertain factors may cause the present invention to slide for a certain distance along the guide track 1. To reduce the occurrence of the above situation, when the first driving mechanism 5 is switched off, the second driving mechanism 12 is started simultaneously, and the second driving mechanism 12 drives the stop mechanism 10 to operate. The stop mechanism 10 stops the brake disc 9 from rotating, the brake disc 9 drives the first transmission shaft 7 to stop rotating, and the first transmission shaft 7 drives the walking mechanism 6 to stop rotating, which assists the first driving mechanism 5 to stop the walking mechanism 6 and effectively controls the positioning accuracy of the stop.

It should be understood that the above embodiments are only used to illustrate the technical solution of the present invention not to restrict it. For those skilled in the art, the technical solution described in the above embodiments may be modified or some of the technical features may be equivalently replaced, and all these modifications and replacements shall fall within the scope of protection of the claims attached to the present invention.

What is claimed is:

1. A self-adaptive heavy-duty gear transmission walking device, comprising a guide track, wherein a carrying seat is slidably installed on the guide track; a loading platform is arranged on the carrying seat, and matching frames are arranged at a bottom of the carrying seat and positioned opposite from each other; a first driving mechanism, a walking mechanism, a first support bracket, a stop mechanism, and a second support bracket are arranged on the carrying seat; a vertical support mechanism and a plurality of sets of horizontal support mechanisms are arranged in the matching frame;

the first driving mechanism is connected to one end of the walking mechanism, and the first driving mechanism is configured to drive the walking mechanism to move; the walking mechanism penetrates through the carrying seat and is magnetically connected to the guide track; the other end of the walking mechanism is connected to a first transmission shaft; the first transmission shaft penetrates through the first support bracket and is fixedly installed with a brake disc, the stop mechanism is configured to stop the brake disc from rotating; a second driving mechanism is arranged on the second support bracket, and the second driving mechanism is configured to drive the stop mechanism to move;

the walking mechanism comprises two sets of third support brackets installed on the carrying seat and positioned opposite from each other; a triangle plate is rotatably installed on each of the third support brackets; three sets of first guide shafts are installed on the triangle plate; a first slider is slidably installed on each of the first guide shafts, and a first spring is sleeved on each of the first guide shafts; one end of the first spring is fixedly connected to the first slider, and the other end of the first spring is fixedly connected to the triangle plate; two sets of first sliders positioned opposite from each other are connected by a second transmission shaft, and magnet assemblies are rotatably installed the second transmission shaft and positioned opposite from each other; the magnet assemblies penetrate through the carrying seat and are magnetically connected to the guide track; the walking mechanism further comprises an angle annular frame arranged on the carrying seat, and the second transmission shaft is slidably connected to an inner annular surface of the angle annular frame;

a magnet and a counterweight block are fixedly connected to form the magnet assembly, and the counterweight block is rotatably connected to the second transmission shaft; and under a force of the counterweight block inside the magnet assemblies, the magnet assemblies are always perpendicular to a horizontal surface of the guide track due to a gravity of the magnet assemblies; during a movement of a set of magnet assemblies, when a lower end of the set of magnet assemblies contacts the horizontal surface of the guide track, the magnet assemblies exert an adsorption force on the guide track; at this time, the first sliders drive the second transmission shafts to continue to move, and when a lower end of a next set of magnet assemblies contact the horizontal surface of the track guide during the movement, the magnet assemblies again exert a new adsorption force on the guide track, the magnet assemblies previously attached to the guide track are separated from the guide track due to a setting of the movement trajectory; the above process is repeated to realize an operation of the walking mechanism.

2. The self-adaptive heavy-duty gear transmission walking device according to claim 1, wherein the first driving mechanism comprises a first motor arranged on the carrying seat, wherein an output shaft of the first motor is provided with a first gear, and a second gear is rotatably installed on the third support bracket on a side of the walking mechanism; the first gear and the second gear are herringbone gears; and the second gear and the first gear are engaged with each other.

3. The self-adaptive heavy-duty gear transmission walking device according to claim 2, wherein the stop mechanism comprises a bottom base arranged on the carrying seat, wherein a plurality of sets of second guide shafts are arranged on the bottom base; second springs are sleeved on both sides of the plurality of sets of second guide shafts, and brake pads for stopping the brake disc are relatively slidably installed on the second guide shafts; one end of the second spring is fixedly connected to the brake pad, and the other end of the second spring is fixedly connected to the bottom base.

4. The self-adaptive heavy-duty gear transmission walking device according to claim 3, wherein the second driving mechanism comprises a second motor arranged on the second support bracket; an output shaft of the second motor penetrates through the second support bracket and is fixedly installed with a driving disc; connecting rods are relatively rotatably installed on the driving disc, and the other ends of the connecting rods are rotatably connected to the brake pads.

5. The self-adaptive heavy-duty gear transmission walking device according to claim 4, wherein the vertical support mechanism comprises a fixed block arranged in the matching frame; third springs are arranged at both ends of the fixed block, and the other ends of the third springs are fixedly installed with first support bases; first sliding rods are arranged on both sides of each of the first support bases, and sliding holes corresponding to positions of the first sliding rods are arranged in the matching frame; the first sliding rods are slidably connected to the matching frame; and first pulleys are rotatably installed on the first support bases.

6. The self-adaptive heavy-duty gear transmission walking device according to claim 5, wherein the horizontal support mechanism comprises a fourth spring arranged in the matching frame, and the other end of the fourth spring is fixedly installed with a second support base; second sliding rods are arranged on both sides of the second support base, and sliding holes corresponding to positions of the second sliding rods are arranged in the matching frame; the second sliding rods are slidably connected to the matching frame; and a second pulley is rotatably installed on the second support base.

7. The self-adaptive heavy-duty gear transmission walking device according to claim 1, wherein the first transmission shaft is provided with a limit piece corresponding to a position of the angle annular frame.

8. The self-adaptive heavy-duty gear transmission walking device according to claim 2, wherein a central shaft of the triangle plate adjacent to the first driving mechanism penetrates through the third support bracket and is fixedly connected to a central shaft of the second gear; and a central shaft of the triangle plate adjacent to the first support bracket penetrates through the third support bracket and is fixedly connected to one end of the first transmission shaft.

9. The self-adaptive heavy-duty gear transmission walking device according to claim 1, wherein the guide track is made from magnetic metal.

10. The self-adaptive heavy-duty gear transmission walking device according to claim 6, wherein the first pulleys penetrate through the matching frame and are slidably connected to the guide track; and the second pulley penetrates through the matching frame and is slidably connected to the guide track.

* * * * *